(12) United States Patent
Lin et al.

(10) Patent No.: US 7,042,715 B2
(45) Date of Patent: May 9, 2006

(54) INFORMATION PRODUCT WITH A ROTATIONAL MECHANISM

(75) Inventors: Yu-Chuan Lin, Hsinchu-Hsien (TW); Chun-Chieh Chen, Tai Nan (TW); Chien-Hua Wu, Miao Li (TW)

(73) Assignee: Ritek Corporation, Hsinchu (TW)

( * ) Notice: Subject to any disclaimer, the term of this patent is extended or adjusted under 35 U.S.C. 154(b) by 96 days.

(21) Appl. No.: 10/769,734

(22) Filed: Jan. 30, 2004

(65) Prior Publication Data

US 2004/0252472 A1    Dec. 16, 2004

(30) Foreign Application Priority Data

Jun. 10, 2003    (TW) .................................. 92210550

(51) Int. Cl.
*G06F 1/16*    (2006.01)

(52) U.S. Cl. ...................................... 361/684; 361/686

(58) Field of Classification Search ................ 361/802, 361/679–686, 724–727; 439/11, 13, 164, 439/638, 586, 640
See application file for complete search history.

(56) References Cited

U.S. PATENT DOCUMENTS

| | | | | |
|---|---|---|---|---|
| 5,572,402 A | * | 11/1996 | Jeong ........................ | 361/685 |
| 5,768,163 A | * | 6/1998 | Smith, II .................... | 361/683 |
| 5,889,649 A | * | 3/1999 | Nabetani et al. ............ | 361/684 |
| 6,093,038 A | * | 7/2000 | Chen et al. .................. | 439/131 |
| 6,519,143 B1 | * | 2/2003 | Goko ........................... | 361/686 |
| 6,650,549 B1 | * | 11/2003 | Chiao .......................... | 361/785 |
| 6,763,410 B1 | * | 7/2004 | Yu ............................... | 710/74 |
| 6,908,324 B1 | * | 6/2005 | Morley et al. ................ | 439/11 |
| 2002/0021551 A1 | * | 2/2002 | Kashiwagi ................... | 361/683 |
| 2002/0081878 A1 | * | 6/2002 | Bruno .......................... | 439/164 |
| 2004/0023520 A1 | * | 2/2004 | Schriefer ...................... | 439/11 |
| 2004/0075977 A1 | * | 4/2004 | Lee .............................. | 361/684 |
| 2005/0105261 A1 | * | 5/2005 | Bhogal ........................ | 361/683 |

* cited by examiner

*Primary Examiner*—Lisa Lea-Edmonds
(74) *Attorney, Agent, or Firm*—J.C. Patents (57) ABSTRACT

An information product with a rotational mechanism is provided. The information product comprises a product body, an interface connection port, and a rotational mechanism. The product body further comprises an indentation, which is used to accommodate a plug-in peripheral device. The interface connection port is disposed in the indentation of the product body and is electrically connected with the plug-in peripheral device. The rotational mechanism is disposed in the indentation of the product body and is electrically connected with the product body and the interface connection port, respectively. Wherein, the rotational mechanism is used to adjust the relative position between the interface connection port and the product body, such that the plug-in peripheral device electrically connected with the interface connection port can be accommodated in the indentation with the help of the rotational mechanism.

17 Claims, 6 Drawing Sheets

INFORMATION PRODUCT WITH A ROTATIONAL MECHANISM

CROSS-REFERENCE TO RELATED APPLICATION

This application claims the priority benefit of Taiwan application serial no. 92210550, filed on Jun. 10, 2003.

BACKGROUND OF THE INVENTION

1. Field of the Invention

The present invention relates to an information product, and more particularly, to an information product with a rotational mechanism.

2. Description of the Related Art

Along with the progress of electronic technology, computer device has become an essential object of our daily life. Various computers including a server, a workstation, a desktop computer, a portable computer, or even an industrial computer, have become a part of our daily life. Therefore, more and more people are using notebook or desktop computer to access data and connect various types of application products to notebook or personal computer through various interfaces, such as the USB or IEEE 1394 interface. For example, a convenient portable disk, a general digital camera, or a Personal Digital Assistant (PDA) is a practical example of the external plug-in peripheral device using the USB or IEEE 1394 interface to electrically connect to the computer.

Figure 1:
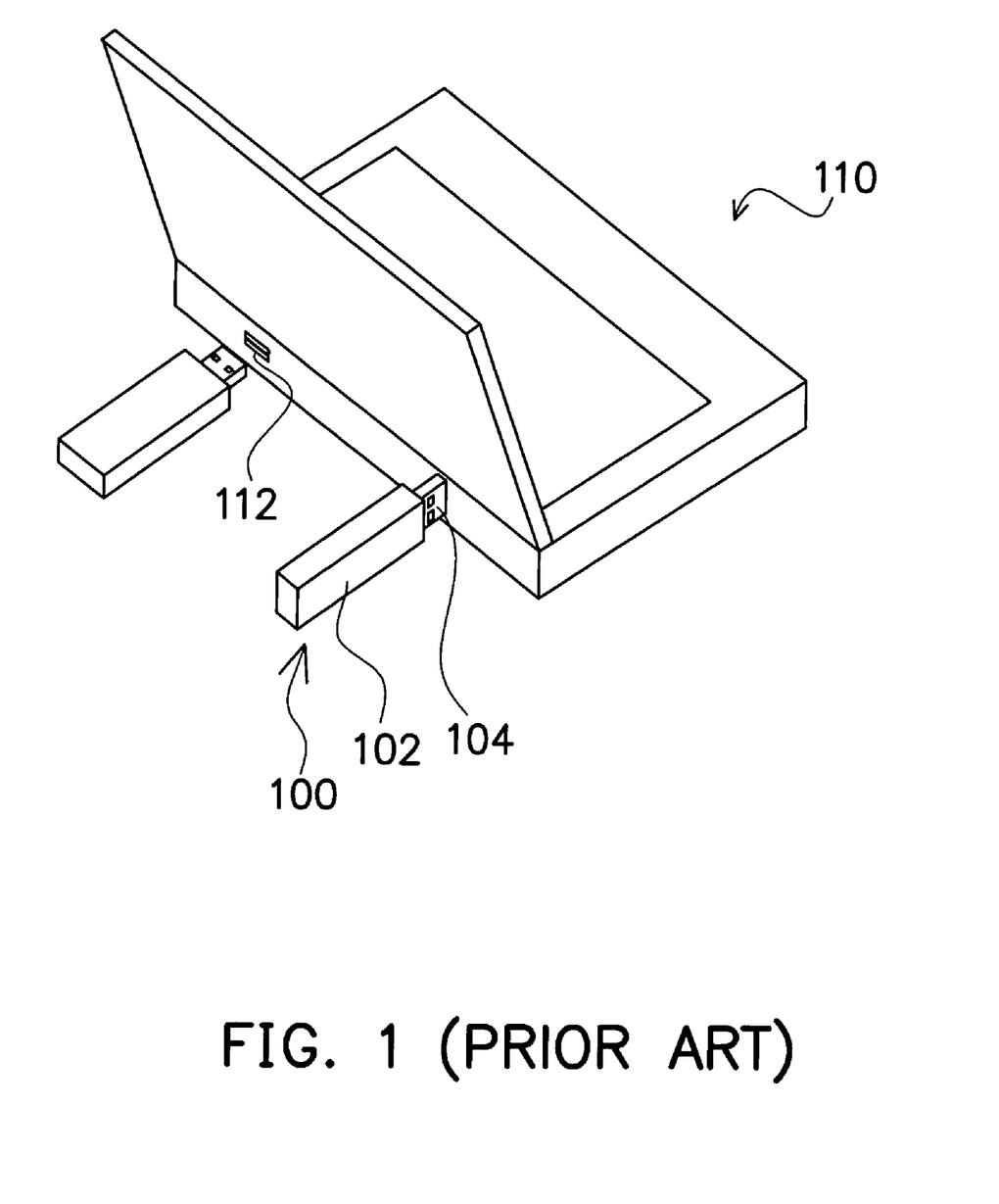
FIG. 1 is a schematic 3D diagram illustrating a electrically connecting a conventional plug-in peripheral device to a notebook computer.

FIG. 1 is a schematic diagram illustrating the way that a conventional plug-in peripheral device electrically connects with a notebook computer. Referring to FIG. 1, the plug-in peripheral device 100 comprises a memory module 102 and a connector 104. Wherein, the memory module 102 is a memory type product. In other words, the memory module 102 may be a portable memory module or a card reader device, which can be used to access data stored in the memory cards. The interface of the connector 104 may be a USB, an IEEE 1394, or other interface. In addition, the notebook computer 110 comprises at least an interface connection port 112, which is commonly disposed on both sides or on backside of the notebook computer 110. Therefore, while the plug-in peripheral device 100 is being accessed, the plug-in peripheral device 100 can be electrically connected with the notebook computer 110 with the help of the connector 104 to plug it into the interface connection port 112 of the notebook computer 110, and to access the data stored in the plug-in peripheral device 100 by operating the notebook computer 110. Since the memory module 102 and the connector 104 are integrated together, when the connector 104 of the plug-in peripheral device 100 is plugged into the interface connection port 112 of the notebook computer 110, the plug-in peripheral device 100 is protruded from both sides or from backside of the notebook computer 110.

The protrude of the plug-in peripheral device from both sides or from back side of the notebook computer has following disadvantages:

1. The body of the plug-in peripheral device or the interface connection port may be permanently damaged by the external force due to the accident.
2. When the user has completed the works on the notebook computer and would like to put the notebook computer into a protection case (not shown), since the long length of the plug-in peripheral device, the plug-in peripheral device cannot be accommodated into a protection case along with the notebook computer. In other words, in order to accommodate the notebook computer in the protection case, the user has to unplug the plug-in peripheral device from the notebook computer first and carries it separately, thus makes a great inconvenience to the user for carrying the notebook computer.
3. Since the plug-in peripheral device is protruded from both sides or from backside of the notebook computer, it may entangle with the neighboring connectors and wires so often that the user has to separate the neighboring connectors and wires from the plug-in peripheral device first, which causes a great inconvenience to the user when using such device.

SUMMARY OF THE INVENTION

In the light of the preface, the present invention is related to an information product with a rotational mechanism. By rotating and/or shifting the rotational mechanism, the entanglement of the plug-in peripheral device with the connectors and wires of the neighboring product body can be avoided, and the rotational mechanism can be used to accommodate the plug-in peripheral device into the indentation of the product body. Therefore, the user can accommodate the product body into the protection case along with the plug-in peripheral device to facilitate easy carriage of the notebook computer by the user.

An information product with a rotational mechanism is provided. The information product comprises a product body, an interface connection port, and a rotational mechanism. The product body further comprises an indentation, which is used to accommodate a plug-in peripheral device. The interface connection port is disposed in the indentation of the product body and is electrically connected with the plug-in peripheral device. The rotational mechanism is disposed in the indentation of the product body and is electrically connected with the product body and the interface connection port, respectively. Wherein, the rotational mechanism is used to adjust the relative position between the interface connection port and the product body, such that the plug-in peripheral device electrically connected with the interface connection port can be accommodated in the indentation.

In accordance with an embodiment of the present invention, the information product mentioned above may be one of a desktop computer, a notebook computer, a digital camera, a PDA, a mobile phone and a digital palm camcorder. Wherein, a notch is disposed on a side edge of the indentation in the product body for facilitating the user to eject the memory module from the indentation of the product body.

In accordance with an embodiment of the present invention, the plug-in peripheral device may be a memory module or a bluetooth module. In addition, the memory module may be a flash memory module or a nonvolatile memory module. The interface used by the interface connection port may be a universal interface such as the USB or IEEE 1394 interface.

In accordance with an embodiment of the present invention, the product body further comprises a card ejecting mechanism, and the card ejecting mechanism may be disposed in the indentation. The card ejecting mechanism further comprises a push bar stand, a protruding device, a push bar, and a push button. The push bar stand is disposed in the indentation mentioned above, and the push bar is disposed in the push bar stand. The protruding device is disposed in the push bar stand, one end of the push bar is connected with the protruding device, and the other end of the bush bar is connected with the bush button. Therefore, the design of the card ejecting mechanism makes the user eject the plug-in peripheral device from the product body more conveniently.

The present invention applies an information product with a rotational mechanism, thus it can avoid the entanglement of the plug-in peripheral device with the connectors and wires of the neighboring product body. In addition, by rotating and/or shifting the rotational mechanism, the present invention can accommodate the plug-in peripheral device into the indentation of the product body, and the plug-in peripheral device can be accommodated along with the product body in the protection case.

The present invention applies an information product with a rotational mechanism, it does not only facilitate the user in carrying, but also adjust the relative position between the plug-in peripheral device and the product body by rotating and/or shifting the rotational mechanism, such that the plug-in peripheral device can be accommodated in the indentation of the product body and the possibility of damage caused by the external collision can be substantially reduced.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

In the present embodiment, in order to extend its function, the plug-in peripheral device may connected to the product body. The product body in the present embodiment may be an information product, such as a notebook computer, a desktop computer, a digital camera, a PDA, a mobile phone, or a digital palm camcorder. A notebook computer is exemplified hereinafter for description.

Figure 2:
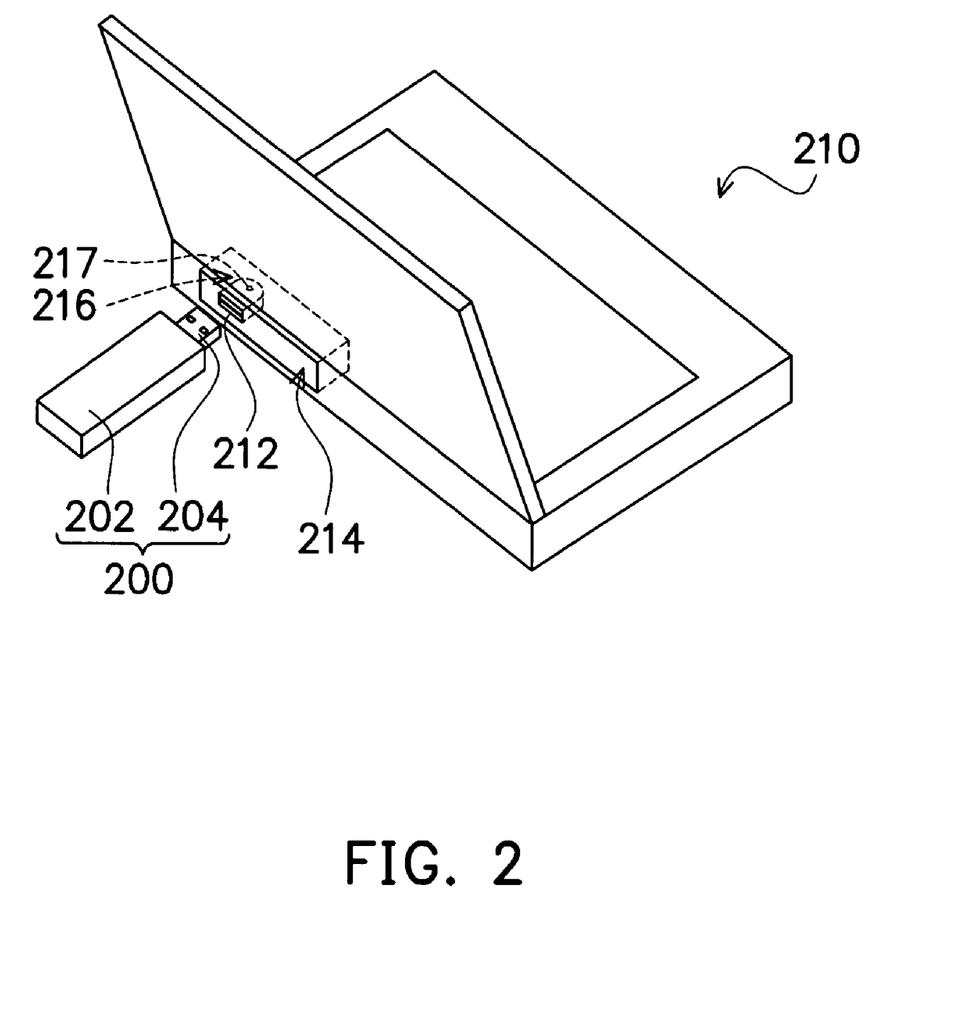
FIG. 2 is a schematic diagram illustrating a scheme of electrically connecting a plug-in peripheral device to a notebook computer with a rotational mechanism according to an embodiment of the present invention.

FIG. 2 is a schematic 3D diagram illustrating the way that a plug-in peripheral device of a preferred embodiment according to the present invention is electrically connected to a notebook computer with a rotational mechanism. Referring to FIG. 2, the plug-in peripheral device 200 comprises a memory module 202 and a connector 204. Wherein, the memory module 202 may be a flash memory module or a nonvolatile memory module. However, it will be apparent to one of the ordinary skill in the art that the memory module 202 is not necessarily limited by the flash memory module or the nonvolatile memory module mentioned above. Alternatively, it may be a memory adapter, such as a card reader or a similar product, which is commonly seen in the market.

The plug-in peripheral device 200 is electrically connected to the interface connection port 212 of the notebook computer 210 with the help of the connector 204, such that the data stored in the memory module 202 can be accessed by operating the notebook computer 210. Wherein, the interface used in the connector 204 may be a universal connection interface such as the USB or IEEE 1394 interface. However, it will be apparent to one of the ordinary skill in the art that the plug-in peripheral device 200 mentioned above is not necessarily limited to be the memory module 202 mentioned above. Alternatively, the plug-in peripheral device 200 also can be a bluetooth module or other similar device.

The notebook computer 210 comprises an interface connection port 212, an indentation 214, and a rotational mechanism 216. Wherein, the indentation 214 is for example disposed on both sides or on a backside of the notebook computer 210, and its exact position depends on the design of the notebook computer 210. In the present embodiment, the indentation 214 is disposed on the backside of the notebook computer 210, and it may be a rectangle box or other shape. In general, an empty space is enclosed by four sides and a bottom side of the indentation 214, and the space having an outward outlet is big enough to accommodate the plug-in peripheral device 200. The interface connection port 212 and the rotational mechanism 216 are disposed in the indentation 214, and the rotational mechanism 216 is electrically connected in between the notebook computer 210 and the interface connection port 212, respectively. The notebook computer 210 is electrically connected to the interface connection port 212 via the rotational mechanism 216, and also electrically connected to the plug-in peripheral device 200 via the interface connection port 212. Wherein, the interface used in the interface connection port 212 is a universal connection interface such as the USB or IEEE 1394 interface.

The rotational mechanism 216 is, for example, composed of a rotational head 217. However, it is not necessarily limited to be composed of only one rotational head. Alternatively, the rotational mechanism 216 of the present invention may be composed of a plurality of rotational heads. Wherein, the rotational mechanism 216 is used to adjust the relative position between the interface connection port 212 and the notebook computer 210, and to accommodate the plug-in peripheral device 200 mentioned above into the indentation 214 of the notebook computer 210 with the help of the rotational mechanism 216. The operation of the rotational mechanism 216 is descried in detail hereinafter.

Referring to FIG. 2, when the user intends to access data, the connector 204 of the plug-in peripheral device 200 is plugged into the interface connection port 212 of the notebook computer 210. Then, by operating the notebook computer 210, the data is stored into the memory module 202 of the plug-in peripheral device 200 or the data is read from the memory module 202 of the plug-in peripheral device 200. Contrarily, when the user does not use the notebook computer 210, the interface connection port 212 is rotated and/or shifted along with the rotation and/or shift of the rotational mechanism 216 of the notebook computer 210, so as to change the relative position between the plug-in peripheral device 200 and the notebook computer 210 and further to accommodate the plug-in peripheral device 200 in the indentation 214 of the notebook computer 210. As a result, it can facilitate the user in carrying the notebook computer and reduce the possibility of damage of the plug-in peripheral device 200 caused by the external collision.

In addition, along with the progress of the electronic technology, the notebook computer 210 and the plug-in peripheral device 200 has been made thinner, thus it is not easy for the user to eject the plug-in peripheral device 200 from the indentation 214 with his/her fingers. Therefore, an auxiliary device may be further added onto the side edge of the indentation 214 in the notebook computer 210, or may be added onto the internal or external of the indentation 214, so as to help the user to eject the plug-in peripheral device 200 from the indentation 214. The connection of the auxiliary device and the notebook computer is descried in detail hereinafter.

Figure 3:
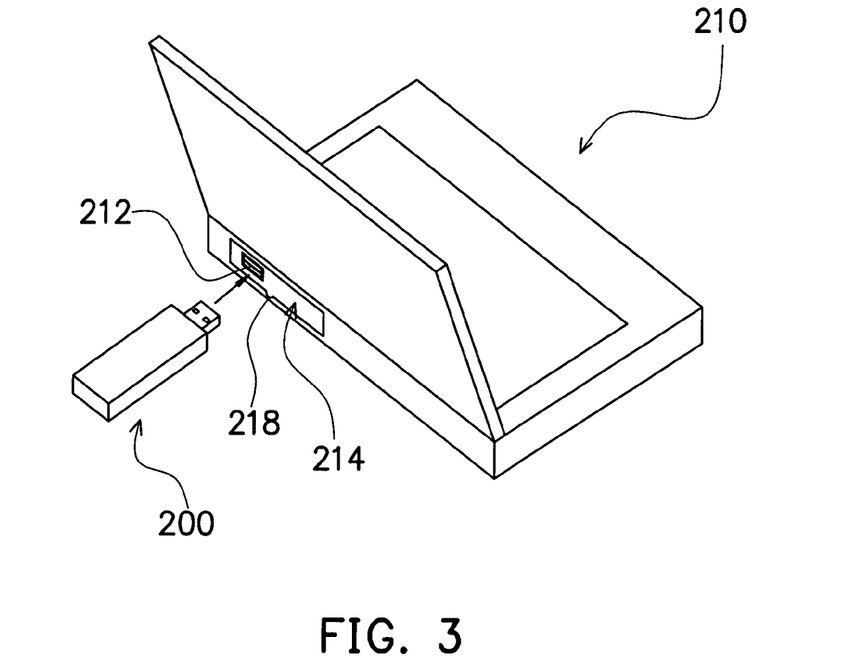
FIG. 3 is a schematic diagram illustrating a notch on the side edge of the indentation in the notebook computer according to an embodiment of the present invention.
Figure 4:
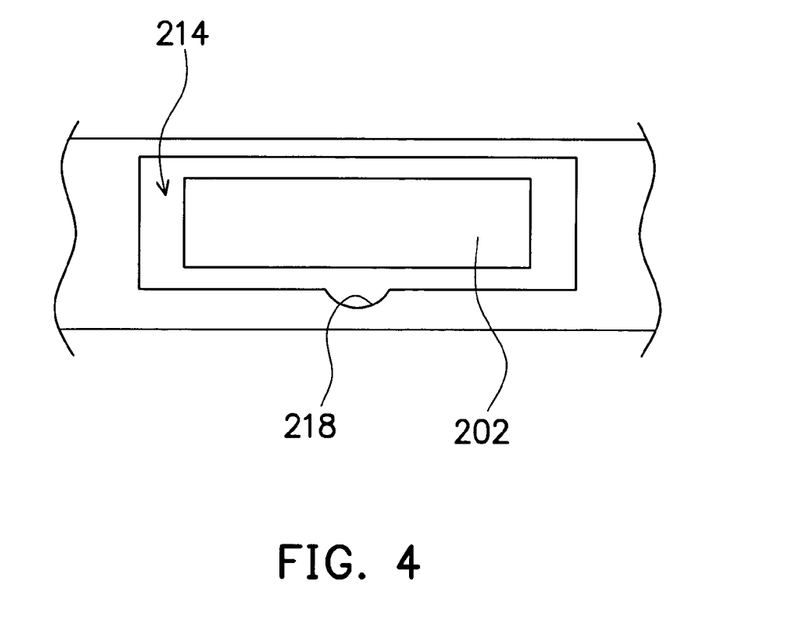
FIG. 4 schematically shows a magnified diagram illustrating an embodiment in which the plug-in peripheral device of FIG. 3 had been accommodated in the indentation.

FIG. 3 is a schematic diagram illustrating a notch on the side edge of the indentation in the notebook computer according to an embodiment of the present invention. FIG. 4 schematically shows a magnified diagram illustrating the plug-in peripheral device of FIG. 3 being accommodated in the indentation. Referring to FIGS. 3 and 4, the notebook computer 210 is disposed on the side edge of the indentation 214, and there is one or more notch 218 on the side edge. Wherein, the notch 218 is used to eject the memory module 202 from the indentation 214. Therefore, when the user intends to eject the plug-in peripheral device 200 from the indentation 214, with the help of the notch 218, the indentation 214 has more accommodation space, and the user can use fingers to hold the memory module 202 via the notch 218, so as to eject the plug-in peripheral device 200 from the indentation 214.

Figure 5:
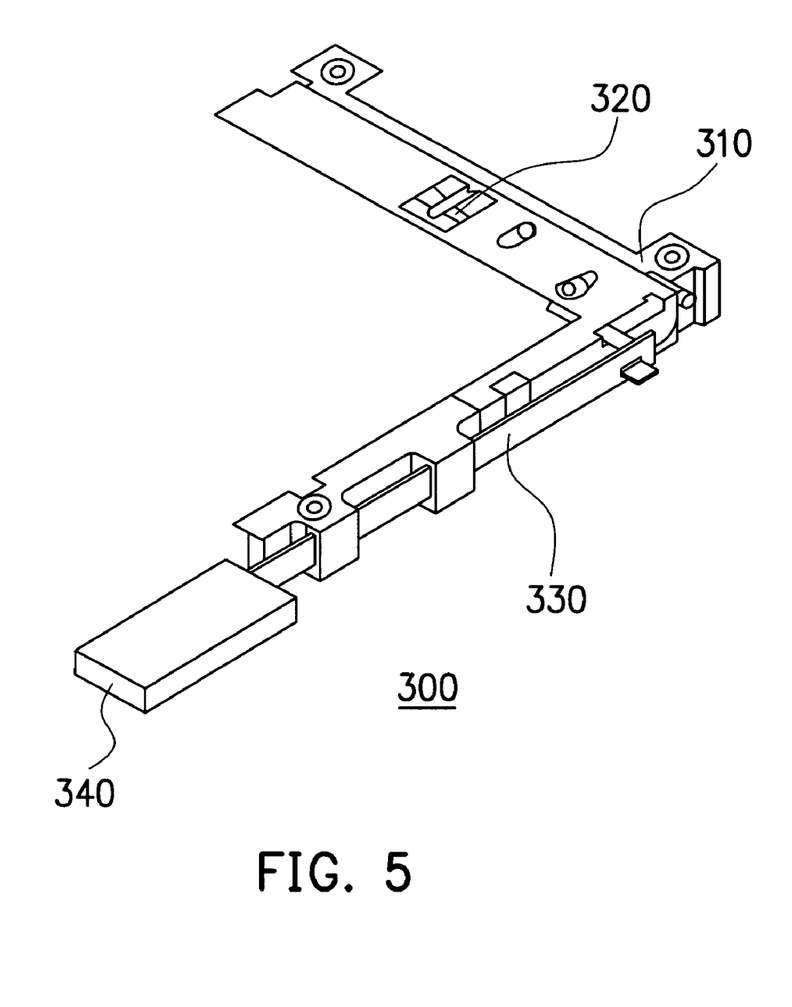
FIG. 5 is a magnified diagram illustrating a card ejecting mechanism of the notebook computer according to an embodiment of the present invention.

FIG. 5 is a magnified diagram illustrating a card ejecting mechanism of the notebook computer according to an embodiment of the present invention. Referring to FIG. 5, a card ejecting mechanism 300 may be further configured in the indentation 214 of the notebook computer 210. The card ejecting mechanism 300 comprises a push bar stand 310, a protruding device 320, a push bar 330 and a push button 340. The push bar stand 310 is disposed in the indentation 214, the push bar 330 is disposed in the push bar stand 310, and the protruding device 320 is disposed in the push bar stand 310. Wherein, one end of the push bar 330 is connected with the protruding device 320, and the other end of the push bar 330 is connected with the push button 340. Part of the push button 340 is exposed outside the indentation 214.

Figure 6A:
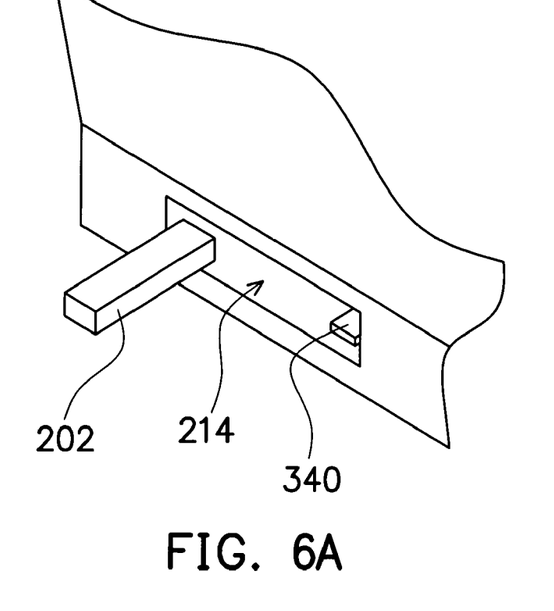
FIGS. 6A~6B schematically shows magnified diagrams illustrating before and after the plug-in peripheral device had been accommodated in the indentation according to an embodiment of the present invention.
Figure 6B:
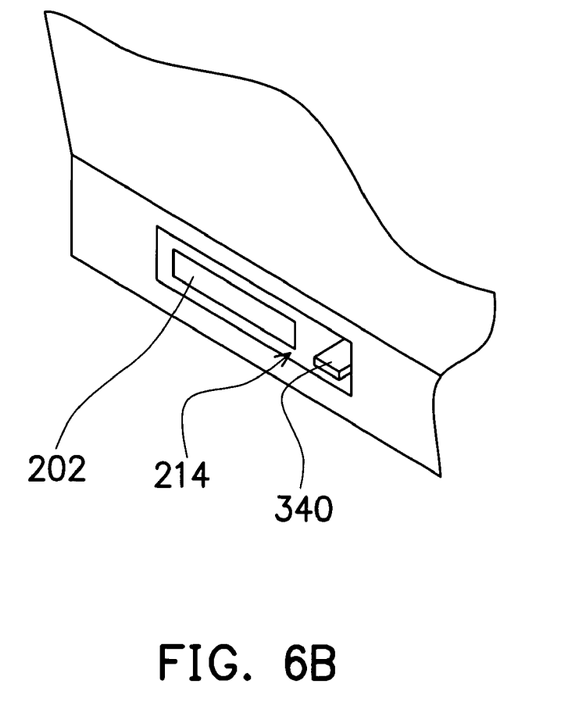

FIG. 6A~6B schematically shows magnified 3D diagrams illustrating before and after the plug-in peripheral device being accommodated in the indentation. Referring to FIGS. 6A and 6B, when the plug-in peripheral device is not in use, the plug-in peripheral device can be accommodated in the indentation 214 by rotating and/or shifting the rotational mechanism. Meanwhile, the memory module 202 will touch the protruding device, and the push button 340 will shift a certain distance (not shown) toward to the direction away from the indentation 214 as shown in FIG. 6B. On the other hand, when the user needs to use the plug-in peripheral device, with pressing the push button 340, the protruding device of the card ejecting mechanism 300 will push the memory module 202 to eject the plug-in peripheral device from the indentation 214 as shown in FIG. 6A.

Figure 7:
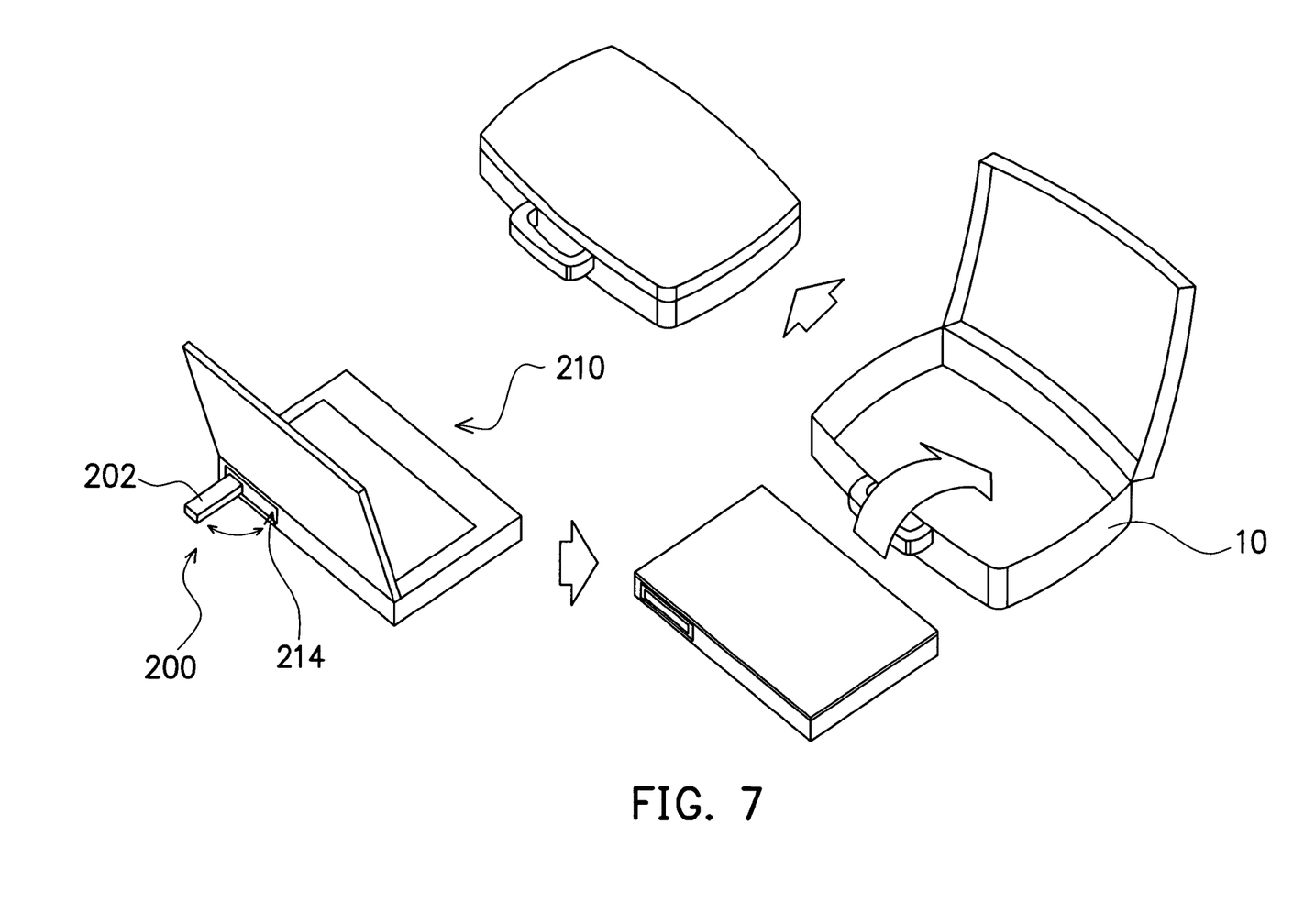
FIG. 7 is a flow chart for illustrating an operation of accommodating the plug-in peripheral device along with the notebook computer having the rotational mechanism in a protection case according to an embodiment of the present invention.

FIG. 7 is a flow chart illustrating an operation of accommodating the plug-in peripheral device in a protection case along with the notebook computer having the rotational mechanism. Referring to FIG. 7, after the user has completed the works on the notebook computer 210, by rotating and/or shifting the rotational mechanism, the relative position between the plug-in peripheral device 200 and the notebook computer 210 is changed, so as to avoid entanglement with the neighboring connectors and wires and to further reduce the possibility of damage caused by the external collision. In addition, by rotating and/or shifting the rotational mechanism, the plug-in peripheral device 200 can be accommodated in the indentation 214 located on the backside of the notebook computer 210. Therefore, the user can accommodate the plug-in peripheral device 200 in a protection case 10 along with the notebook computer 210, so as to facilitate the user in carrying the notebook computer.

In addition, the indentation of the information product with the rotational mechanism provided by the present invention is not necessarily limited to be disposed in the notebook computer as mentioned above. Alternatively, the indentation also can be disposed in the information product such as a digital camera, a PDA, a mobile phone, a desktop computer, such that the plug-in peripheral device can be accommodated into the indentation with the help of the rotational mechanism of the indentation.

In summary, the present invention at least has following advantages:

1. In the information product with the rotational mechanism provided by the present invention, by rotating and/or shifting the rotational mechanism, the relative position between the plug-in peripheral device and the notebook computer can be changed, such that the damage caused by the external collision can be reduced.

2. In the information product with the rotational mechanism provided by the present invention, by rotating and/or shifting the rotational mechanism, the plug-in peripheral device can be accommodated in the indentation of the notebook computer, such that the user can accommodate the plug-in peripheral device in a protection case along with the notebook computer, so as to facilitate the user in carrying the notebook computer.

3. In the information product with the rotational mechanism provided by the present invention, by rotating and/or shifting the rotational mechanism, the entanglement of the plug-in peripheral device with the connectors and wires of the neighboring notebook computer can be avoided, so as to facilitate their usage.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. An information product with a rotational mechanism, comprising:
   a product body, having a slot;
   an interface connection port, disposed in the slot for electrically connecting to a plug-in peripheral device; and a rotational mechanism, disposed in the slot, wherein the product body is coupled to the interface connection port via the rotational mechanism, and the rotational mechanism is used to adjust a relative position between the interface connection port and the product body, such that the plug-in peripheral device electrically connected with the interface connection port can be inserted inside the slot with the help of the rotational mechanism.

2. The information product with the rotational mechanism of claim 1, wherein the product body is any one selected from a group consisting of a desktop computer, a notebook computer, a digital camera, a PDA, a mobile phone and a digital palm camcorder.

3. The information product with the rotational mechanism of claim 1, wherein the plug-in peripheral device comprises a memory module or a bluetooth module.

4. The information product with the rotational mechanism of claim 3, wherein the memory module is either a flash memory module or a nonvolatile memory module.

5. The information product with the rotational mechanism of claim 1, wherein an interface used in the interface connection port is a USB interface.

6. The information product with the rotational mechanism of claim 1, wherein an interface used in the interface connection port is an IEEE 1394 interface.

7. The information product with the rotational mechanism of claim 1, wherein the product body further comprises at least a notch, and the notch is disposed on a side edge of the slot.

8. The information product with the rotational mechanism of claim 1, wherein the product body further comprises a card ejecting mechanism, and the card ejecting mechanism is disposed in the slot.

9. The information product with the rotational mechanism of claim 8, wherein the card ejecting mechanism comprises:
   a push bar stand, disposed in the indentation;
   a protruding device, disposed in the push bar stand;
   a push bar, disposed in the push bar stand, and one end of the push bar being connected with the protruding device; and
   a push button, connected with the other end of the push bar.

10. An information product with a rotational mechanism, comprising:
   a product body, having an indentation for accommodating a plug-in peripheral device of the product body and a card ejecting mechanism disposed in the indentation;
   an interface connection port, disposed in the indentation for electrically connecting to the plug-in peripheral device; and
   a rotational mechanism, disposed in the indentation, wherein the product body is coupled to the interface connection port via the rotational mechanism, and the rotational mechanism is used to adjust a relative position between the interface connection port and the product body, such that the plug-in peripheral device electrically connected with the interface connection port can be accommodated in the indentation with the help of the rotational mechanism.

11. The information product with the rotational mechanism of claim 10 wherein the card ejecting mechanism comprises:
   a push bar stand, disposed in the slot;
   a protruding device, disposed in the push bar stand;
   a push bar, disposed in the push bar stand, and one end of the push bar being connected with the protruding device; and
   a push button, connected with the other end of the push bar.

12. The information product with the rotational mechanism of claim 10, wherein the product body is any one selected from a group consisting of a desktop computer, a notebook computer, a digital camera, a PDA, a mobile phone and a digital palm camcorder.

13. The information product with the rotational mechanism of claim 10, wherein the plug-in peripheral device comprises a memory module or a bluetooth module.

14. The information product with the rotational mechanism of claim 13, wherein the memory module is either a flash memory module or a nonvolatile memory module.

15. The information product with the rotational mechanism of claim 10, wherein an interface used in the interface connection port is a USB interface.

16. The information product with the rotational mechanism of claim 10, wherein an interface used in the interface connection port is an IEEE 1394 interface.

17. The information product with the rotational mechanism of claim 10, wherein the product body further comprises at least a notch, and the notch is disposed on a side edge of the indentation.

* * * * *